United States Patent [19]

Slaats et al.

[11] 4,142,139

[45] Feb. 27, 1979

[54] SEARCH MOUNT FOR TELESCOPE AND METHOD OF OPERATION

[75] Inventors: Mathew A. Slaats; Alan B. Welsh; Wade R. Bray, all of Jasper, Ind.

[73] Assignee: Kimball International, Inc., Jasper, Ind.

[21] Appl. No.: 809,989

[22] Filed: Jun. 27, 1977

[51] Int. Cl.² .............................................. G05B 19/28
[52] U.S. Cl. .................................. 318/603; 318/648; 318/12; 33/247
[58] Field of Search ................ 318/603, 648, 649, 15, 318/12; 33/247, 248

[56] References Cited

U.S. PATENT DOCUMENTS

| 2,989,672 | 6/1961 | Agins | 318/649 |
|---|---|---|---|
| 3,372,321 | 3/1968 | Inaba et al. | 318/603 X |
| 3,399,753 | 9/1968 | Revelle | 318/603 X |
| 3,414,785 | 12/1968 | Orahood et al. | 318/603 |
| 3,465,217 | 9/1969 | Kress | 318/603 X |
| 3,826,964 | 7/1974 | Byrne | 318/603 X |

Primary Examiner—Benjamin Dobeck
Attorney, Agent, or Firm—Albert L. Jeffers; John F. Hoffman

[57] ABSTRACT

A search mount for a telescope and a method of operation in which a telescope mount is provided which is indexable about a vertical axis and also about a horizontal axis so as to lay the telescope in any desired direction. The mount is provided with motors, and the movement of the motors is under the control of digital circuitry, and manual switches. The drives between the motors in the telescope mount embody backlash free reduction gearing of novel design and construction. In particular, the motors operate without requiring any feedback to effect control thereof.

16 Claims, 5 Drawing Figures

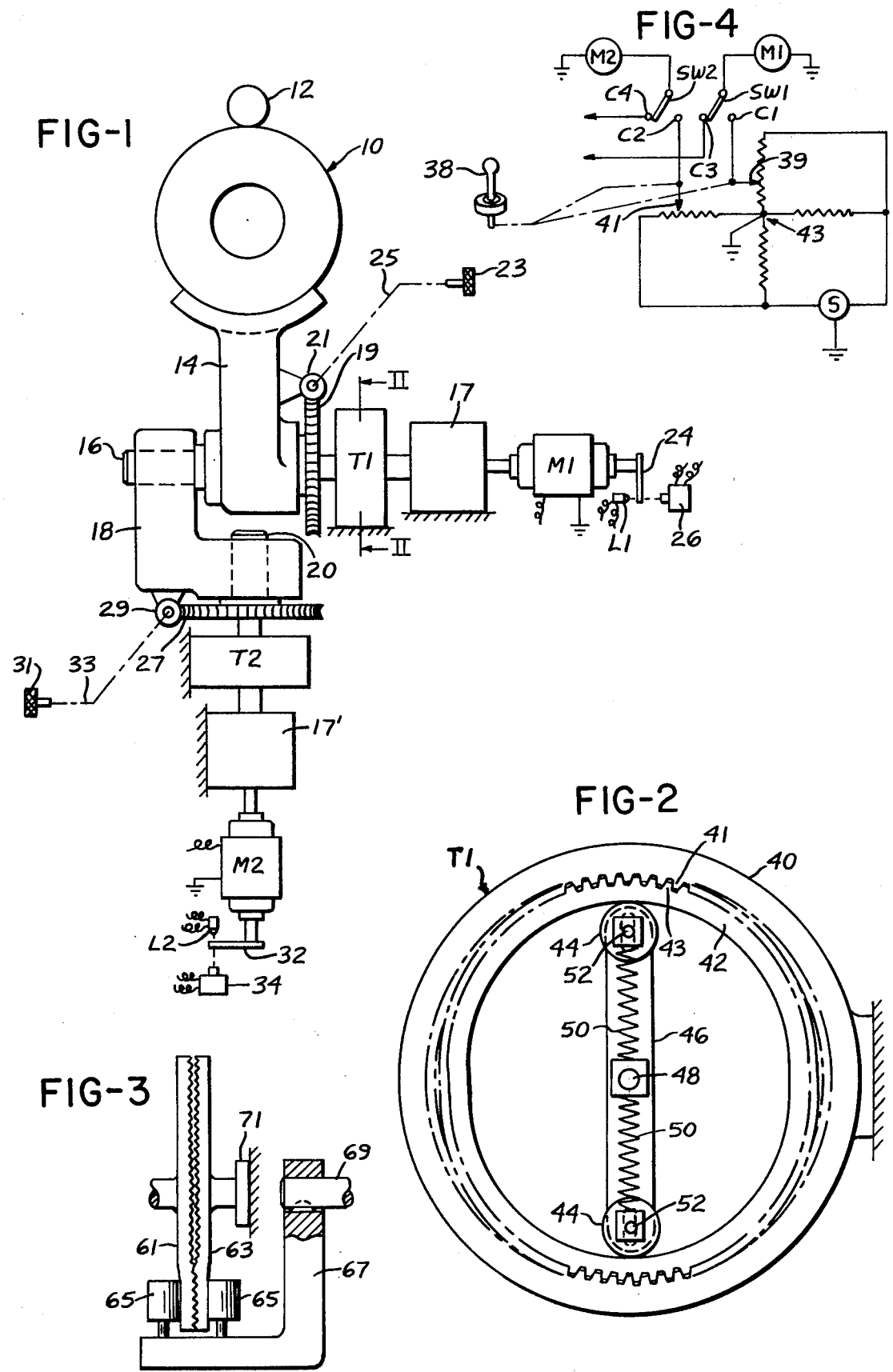

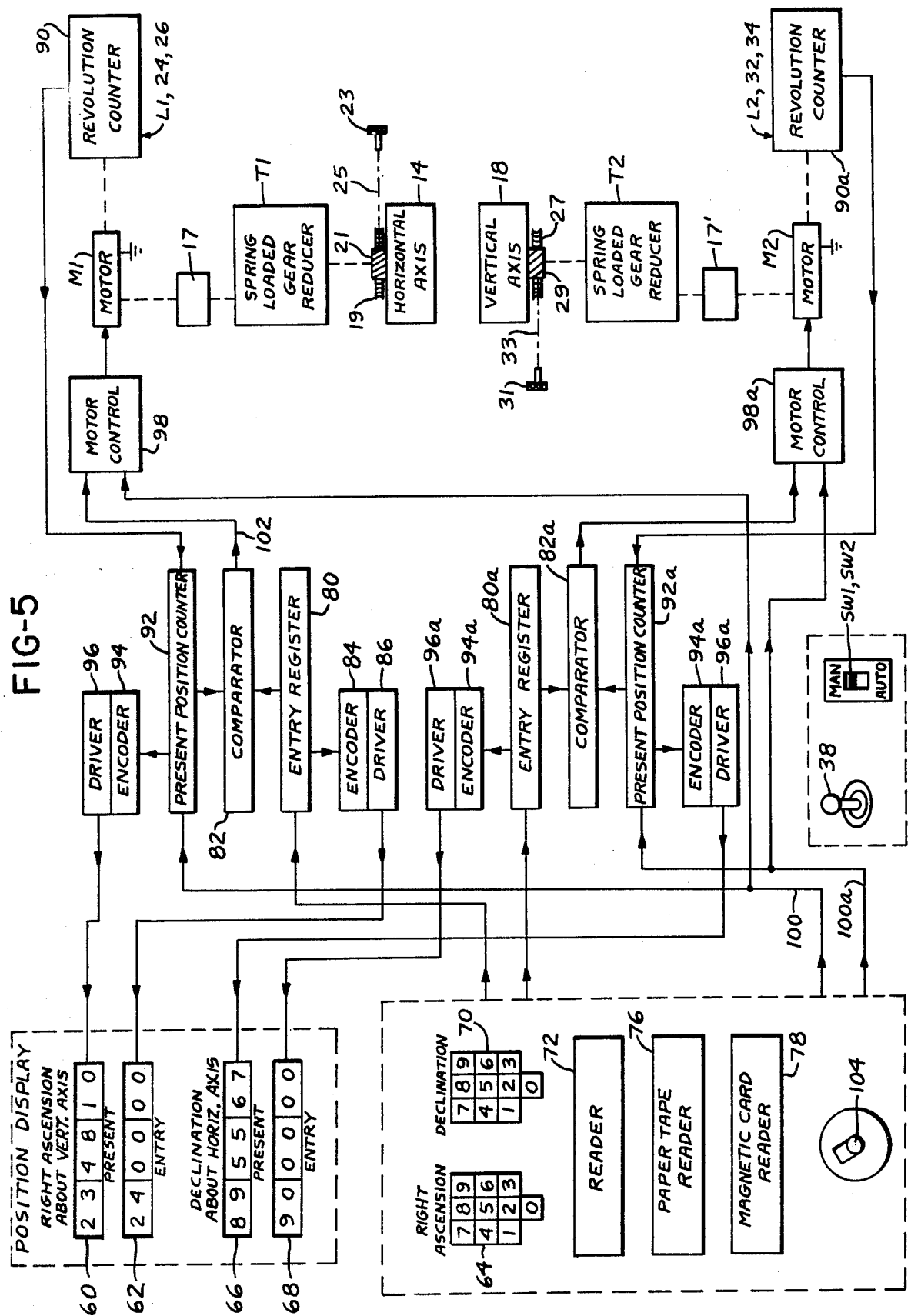

SEARCH MOUNT FOR TELESCOPE AND METHOD OF OPERATION

The present invention relates to a motorized telescope mount and the method of operation.

Telescope mounts are, of course, well known but, heretofore, when capable of effective automatic control of movement of the telescope, have been quite elaborate and expensive. In prior art devices for moving telescope mounts, for example, optical encoders were quite frequently used with the angle of movement of the mount being measured and the drive mechanism shut off by a feedback signal when a desired angle was reached.

In the device shown in the present application, digital techniques are employed so that angles need not be measured but can, instead, be determined by the number of units of movement that the mount moves from a given zero position.

The construction of a motorized mounting arrangement according to the present invention can be relatively simple and inexpensive and the control circuitry therefor is, likewise, relatively inexpensive and straightforward so that an accurate motor driven telescope mount becomes a practical device for use with a relatively inexpensive telescope.

By using digital techniques, the customary units for declination and for right ascension can be expressed in conventional units, without any problems being presented. Any base for coordinates can be employed but, in general, the hours, minutes and seconds for input ascension and degrees, minutes and seconds for declination is preferred.

An object of the present invention is the provision, as mentioned, of a relatively inexpensive motorized telescope mount.

Another object of the present invention is the provision of a relatively inexpensive telescope mount which does not depend on a diminishing feedback signal to halt movement of the telescope in a desired position.

A still further object is the provision of a telescope mount which will normally lay a telescope to a degree of accuracy such as to permit the article or body to be observed to come well within the lateral range of vision of the telescope.

A still further object of the present invention is the provision of a motorized telescope which, having been laid in a predetermined direction, can be manually adjusted within predetermined limits.

BRIEF SUMMARY OF THE INVENTION

According to the present invention, the telescope mount is provided on which a telescope can be mounted with the mount being movable about an upright axis and with the mount also being provided with means for tilting the telescope vertically. The aforesaid movements of the telescope mount to achieve the desired orientation are under the control of motors with a digital control system pertaining to each motor.

The motors need not be stepping motors, but are provided with means for developing a digital signal in conformity with the rotation of the motors which is supplied to the control system.

The amount of movement desired for each motor is inserted into the control system by means of an array of push buttons and, thereafter, when the motors are started, the digital signals developed by the motors will count either up or down to the value inserted by the push button arrays and the movement of the telescope mount will come to a halt when the counts built up by rotation of the motors matches the inserted coordinates.

A gear reducer of novel design is interposed between each motor and the portion of the telescope mount which is to be moved thereby with each step of each motor moving the telescope mount by five arc-minutes in the respective direction. The viewing area can thus be considered to be divided into a grid with each square measuring five arc-minutes on each side. The viewing area of a typical 3 inch or 5 inch telescope is about 30 arc-minutes so that, if the coordinates of an object to be viewed are known, the telescope can automatically be laid to a position such that the object will be well within the viewing range of the telescope.

The exact nature of the present invention will become more clearly apparent upon reference to the following detailed specification taken in connection with the accompanying drawings in which:

FIG. 1 is a schematic showing of one manner in which a telescope mount according to the present invention could be constructed.

FIG. 2 is a sectional view indicated by line II—II on FIG. 1 and showing one type of gear reduction for use between the drive motors and the telescope mount.

FIG. 3 is a schematic view of another type of reduction gearing that can be used between a drive motor and the part of the telescope mount driven thereby.

FIG. 4 is a schematic view showing how manual control over the drive motors can be obtained.

FIG. 5 is a schematic showing of the control circuit employed for controlling the driving motors for the telescope mount.

DETAILED DESCRIPTION OF THE INVENTION

Referring to the drawings somewhat more in detail, in the schematic representation of the telescope mount in FIG. 1, reference numeral 10 is a telescope and 12 is a spotting scope which may be attached to the side thereof. The spotting scope is not absolutely necessary but may be used to view a larger field than the telescope 10.

Telescope 10 is mounted on a member 14 which is connected to a shaft 16 which is rotatable about a horizontal axis. The bearing and support member 18 supporting shaft 16 is, in turn, mounted on a shaft 20 for rotation about an upright axis.

Member 14 is adapted for being driven about the aforementioned horizontal axis by a motor M1 which is connected to drive the input member of a speed reducing transmission T1 which has an output member connected to a worm wheel 19 which is engaged by a worm 21 carried by member 14 and adapted for being adjusted by a knurled knob 23 which is connected with the said worm via flexible cable means 25. Interposed between the output shaft of motor M1 and the input member of transmission T1 is a gear reducer 17 having a ratio of 54 to 1. Motor M1 drives an interrupter 24 which, during rotation of motor M1, interrupts a light beam from a lamp L1 to a photocell 26 once for each rotation of the motor M1.

The lamp and photocell together with interrupter 24 thus provide means for counting the number of revolutions of the respective motor and for obtaining a digital signal for each time motor M1 makes one revolution.

The member 18 is similarly provided with a motor M2 which drives through another 54 to 1 gear reducer 17' and a second speed reducing transmission T2 to member 18. The output side of transmission T2, similarly to transmission T1, is connected with a worm wheel 27 which is engaged by a worm 29 carried by member 18 and adapted for being rotatably adjusted by a knurled knob 31 connected to the worm by a flexible cable 33. Motor M2 also drives a respective interrupter 32 which interrupts a light beam between lamp L2 and photosensitive element 34 once for each rotation of the respective motor.

Motors M1 and M2 are, advantageously, reversible direct current motors such as of the permanent magnet type. As will be seen hereinafter, each motor is adapted for being controlled manually as well as automatically.

Each of the transmissions T1 and T2 is of the type illustrated in FIGS. 2 or 3. In FIG. 2, it will be noted that there is a larger outer gear 40 having internal teeth 41 formed therein and of which there may be, in the example illustrated, 162 teeth.

Inside internal gear 40 is a flexible inner gear 42 having external teeth 43 thereon and which, in the illustrated device, may amount to 160 teeth. Inner gear 42 is flexible and inside inner gear 42 are the diametrically opposite rollers 44 which are movably carried at opposite ends of a drive arm 46 mounted on the output shaft 48 of the respective one of the worm gear reducers 17, 17'. Gear 40 is held against rotation while gear 42 drives the respective one of members 14, 18.

Spring means, such as compression springs 50, bear outwardly against the support shafts 52 for rollers 44 and thus maintain the rollers in pressure engagement with the inner surface of inner gear 42 and, inasmuch as the inner gear is flexible, also maintain the teeth of the inner gear in firm engagement with the teeth 41 of the outer gear.

Both gears or, at least, the inner gear and the toothed portion of the outer gear, are advantageously formed of a plastic material which is at least slightly resilient so that the arrangement illustrated for the transmissions substantially eliminates all backlash therein and provides for highly accurate movement of the gears 40 and 42 relatively in response to movement of the pertaining input shaft 48. Any of several materials suggest themselves as suitable for use for the gears, such as a relatively hard rubber or synthetic rubber, or polyurethane or the like.

It will be apparent that the drive ratio of the illustrated transmission is 80 to 1 and this, taken together with the 54 to 1 reduction obtained in the preceding worm gear speed reducer, establishes a ratio of 4320 to 1 between the respective motor output shaft and the member driven thereby.

In respect of the motor M2, it will be appreciated that 1/54 of 1/80 of 360 degrees is equal to five arc-minutes. The same ratio of movement between the motor M1 and member 14 also pertains. Since each motor supplies a single signal pulse of each revolution, it will be apparent that the motion of the telescope mount about each of the previously referred to horizontal and vertical axes can be controlled in steps of about five arc-minutes, as determined by the gear reducers.

Motors M1 and M2, as mentioned, are advantageously reversible DC motors having permanent magnet fields. The motors are advantageously adapted for manual control, as by use of a tiltable or joy stick type control 38 which is mechanically connected to sliders 39 and 41 movable along respective branches of a potentiometer arrangement generally indicated at 43 and consisting of intersecting resistors having the point of intersection connected to ground and the outer ends of the resistors connected to the plus and minus terminals respective of a direct current source of voltage designated S.

When the manual control circuit for motors M1 and M2 is effective, the switch blades SW1 and SW2 pertaining to the motors are switched over into engagement with contacts C1 and C2 respectively. When the motors are to be automatically controlled by an automatic control circuit, blades SW1 and SW2 are switched over into engagement with contacts C3 and C4 respectively.

The speed reducing arrangement shown at T1 and T2 and illustrated more in detail in FIG. 2 can also take the form of the gear reducing arrangement illustrated somewhat schematically in FIG. 3. In FIG. 3, a pair of gears 61 and 63 are provided which are in the form of discs with radial teeth on the peripheral portions thereof on the sides of the gears which face one another.

The gears are coaxially arranged and are normally spaced from one another. The gears are formed of a material which is at least slightly elastomeric, similarly to the gears of the transmission of FIG. 2, with the teeth on one gear differing in number from the teeth on the other gear for the same purpose as the gears of FIG. 2 differ in number.

The gears 61 and 63 are caused operatively to engage one another by a pair of rollers 65 which press the peripheral portions of the gears together to cause the teeth thereon to mesh in one circumferential region of the gears. Rollers 65 are carried on a drive arm 67 which is driven by a shaft 69 which consists, for example, of the output shaft of one of speed reducing transmissions 17, 17'.

Shaft 69 is, as illustrated, coaxial with gears 61 and 63. As illustrated, gear 63 has a flange or the like at 71 which is held against rotation to prevent gear 63 from rotating while not inhibiting flexing of gear 63 at the periphery thereof. Gear 61, on the other hand, is connected to rotate the worm wheel 19, 27 associated with the respective part of the telescope mount to be driven by the speed reducer.

It will be apparent that the modification of FIG. 3 is advantageously formed with both gears thereof molded from a plastic material which is at least slightly elastomeric, but it will also be evident that one of the gears could be formed of metal and the other gear formed of an elastomeric material.

The control circuitry for effecting automatic control of each motor is illustrated in FIG. 5. In FIG. 5, it will be noted that there is a display at 60 which shows the present position of member 14 with the display indicated showing this position in hours, minutes and seconds. Adjacent display 60 is a second display 62 which represents the last set of coordinates introduced into the machine via the push button array at 64.

Similarly, in respect of member 18, there is a first digital display at 66 which can show, for example, degrees, minutes and seconds, or degrees and minutes pertaining to the particular position occupied by member 18 with a second display 68 adjacent thereto showing the last entry made by a second array of push buttons at 70 and which may be located on a control panel adjacent the aforementioned array 64.

The control panel may also be provided with a reader 72 for magnetic tape which will introduce coordinates into a display or registers 62, 68. Similarly, a paper tape reader is provided at 76 and a magnetic card reader at 78.

The previously mentioned joy stick 38 may be provided adjacent the display panel and the switches operated thereby can be mounted beneath the panel. A selector switch is provided having manual (MAN) and automatic (AUTO) positions and is operable for controlling switch blades SW1 and SW2.

The values entered into, for example, array 64 are transmitted to an entry register 80 which has an output to a comparator 82 and which also supplies an output to an encoder 84 which, through a driver 86, actuates register 62 to show the input setting introduced via push button arrray 64.

The motor under the control of push button array 64 is motor M1. The revolution counter in the form of interrupter 24 and lamp L1 and photosensitive element 26, and indicated in FIG. 5 at 90, supplies pulses to a present position counter 92 which has an input to comparator 82 and which also has an input to encoder 94 which, through driver 96, actuates register 60.

A motor control circuit at 98, when enabled via manually operated control line 100, will supply power to motor M1 to cause it to rotate. When the digital count developed by rotation of motor M1 brings counter 92 up to the same value as that entered into register 80 by array 64, comparator 82 will supply a signal via wire 102 to shut off motor control 98 and motor M1 will halt. At this time, registers 60 and 62 will show the same value.

Each of the motors M1 and M2 has been described as a reversible DC motor, advantageously having a permanent magnet field. It is also advantageous for these motors to be wired, in a known manner, for dynamic braking thereof upon the interruption of the supply of driving current. By employing dynamic braking, each motor, when deenergized, will come to a halt in a fraction of a revolution. When the motors come to a halt, due to shutting off control 98, registers 60 and 62 will show the same value.

The control for motor M2 is the same as that for motor M1 and the same reference numerals are employed for the various components with the addition of a subscript a.

It will be noted that each motor drives through its respective gear reducing train to the pertaining one of members 14, 18 of the telescope mount previously referred to.

The enabling of the respective motor controls 98, 98a may be under the control of a start button 104 on the control panel.

The device of the present invention is designed to hold and aim an optical device, such as a telescope, in any of a plurality of desired positions which, for example, may correspond to predetermined positions on the imaginary "celestial sphere" employed by astronomers for designation of the positions of celestial bodies relative to the earth.

When a device according to the present invention operates automatically, two addresses are introduced by means of the push button arrays, and, thereafter, when a "start" button is actuated, the two motors pertaining to the telescope mount will drive the telescope mount until the telescope is laid or pointed to the position which has been entered into the push button arrays.

The right ascension, which is the position of the telescope about the vertical axis, may be given in hours-minutes-seconds, or in hours-minutes, and is entered in push button array 64 with two digits being assigned to each of the three designations.

As to the declination which is entered in push button array 70, this is normally given as degrees and minutes or as degrees, minutes and seconds.

The right ascension entry may be entered in with the seconds as multiples of 20, for example, while the declinations may be entered with the minutes entered as multiples of five, for example.

After the motors pertaining to the telescope mount have stopped, the joy stick member 38 referred to can be employed, while the motors are under manual control, for effecting fine adjustment of the position of the telescope. At this time, the registers driven by the motors will run so that, when the telescope is finally aligned on the particular object, the exact coordinates of the object will be displayed and can be entered in any suitable log if so desired.

It will also be apparent that the specific physical form for the structure interposed between a stationary support and the telescope, namely, the members 14 and 18 and the interconnecting and supporting structure pertaining thereto, is subject to wide variation, and what is illustrated is only exemplary.

It might also be pointed out that, while member 18 is provided with a support arrangement in which the axis of rotation of member 18 remains vertical, it is also possible to provide a support for member 18 such that the axis of rotation about which member 18 rotates is pointed in a desired direction, for example, toward the polar star. Such mounting of the device could be accomplished by providing a suitable wedge member capable of adjustment to positions of latitude.

If a wedge of the nature referred to above is provided and disposes the upright axis about which member 18 rotates in the proper direction, which would be, as mentioned, toward or near the polar star, a sidereal clock could be provided for driving member 18 about the aforesaid axis and, once the telescope is laid on one of the fixed stars, the telescope would follow the star as the earth rotated.

It will be understood that the showings of the device of the present invention in the drawings is schematic and that the physical form which the device takes could vary substantially from that illustrated.

The gearing arrangement in FIGS. 2 and 3 are, likewise, of a schematic nature. Inasmuch as the two gears illustrated in FIG. 2 differ in number only by two teeth, it will be understood that the acutal difference in pitch diameter of the two gears is quite small so that the clearances between the gears where teeth thereof are not in mesh would be much less than that indicated in FIG. 2.

The gears disclosed in FIG. 3 mesh at only one region about the periphery and, thus, can differ in respect of the number of teeth by unity. Presumably, an arrangement according to FIG. 3 could be employed with the gears pressed into meshing relation at two diametrically opposed regions about the gears, and in which case, the number of teeth on the gears would differ by two as in the case of FIG. 2.

It will also be understood that the specific amount of gear reduction between each drive motor and the member which it actuates could be different from that described, depending on the precision with which adjustment of the viewing device or the telescope is desired. Thus, with a viewing device having a relatively large field, the steps taken by the individual members of the support during adjustment could be larger than the five arc-minutes given as an example in the present application.

Also, even smaller increments of movement could be provided for, although five arc-minutes per increment of movement will take care of most small viewing devices or telescopes for which the device of the present invention finds its particular utility.

It will also be understood that the particular pulse emitting means in the form of a lamp and photocell and interrupter therebetween is not the only device of this nature that could be employed. For example, the pulse emitter would be magnetically operated. It is convenient to provide for the emitting of a single pulse for each revolution of each motor, but it will be apparent that the number of pulses per revolution of the motor would be varied substantially at will.

Finally, it will be appreciated that the disclosed invention has the merit of simplicity and low cost while still maintaining a highly desired accuracy in respect of the aiming of the viewing device.

The system disclosed has the merit that no feedback is required but, rather, the system is of a positive nature. The speed of operation of the device is of no particular consequence because the positive control system provides for stopping of each motor when the respective amount of movement it is supposed to carry out has been completed.

A gearing arrangement involving the internal and external gear is of merit in the organization of the present invention because, by forming the gears from a material which is at least slightly resilient, the gears can be pressed together in the meshing region thereof and thereby eliminate all backlash.

The gears in FIG. 2 have been illustrated as meshing in diametrally opposite regions, and this is possible because the gears differ in the number of teeth by two so that the same meshing conditions exist in both of the meshing regions of the gears. However, the gears could be pressed together is only one circumferential region, as in FIG. 3, if so desired, and the backlash between the gears would be eliminated.

Modifications may be made within the scope of the appended claims.

What is claimed is:

1. A search mount for a telescope or the like comprising:
    support means,
    first and second members and pivot axis means for interconnecting said members for rotational movement relative to said support means about one pivot axis and for rotational movement relative to each other about another pivot axis,
    first and second motor means for causing said relative rotational movement about said axes,
    detector means for directly sensing the number of revolutions made by each motor means and producing first and second series of momentary signals being proportional to the number of revolutions of the first and second motor means, respectively,
    first and second counter means for counting respective said first and second momentary signals,
    first and second register means for storing and displaying data representing the desired positions for said first and second elements, respectively,
    first and second control means operable for energizing said first and second motor means, respectively,
    first comparator means connected to said first register means and said first counter means for disabling said first control means when the values in said first register means and said first counter means are equal,
    second comparator means connected to said second register means and said second counter means for disabling said second control means when the values in said second register means and said second counter means are equal, and
    first and second substantially zero backlash speed reducing means operatively connected between said first and second motor means and said first and second elements, respectively.

2. The search mount according to claim 1 in which each said motor means is a rotary motor.

3. The search mount according to claim 2 in which said detector means for each motor comprises a pulse generator and means actuated by the motor in response to a predetermined amount of rotation thereof for causing said generator to emit a pulse.

4. The search mount according to claim 3 in which said pulse generator comprises a source of light and a photosensitive element positioned to be illuminated by said source, said means actuated by said motor comprising an interrupter driven by the motor for periodically intercepting the light to said element as the respective motor rotates.

5. The search mount according to claim 1 in which said speed reducing means includes geared speed reducer means.

6. The search mount according to claim 1 which includes means for manually and selectively energizing said motor means to effect movement of said members relatively with simultaneous signal supply to the counter means pertaining to the energized ones of said motors.

7. The search mount according to claim 1 in which the drive ratio of said speed reducing means is such that for each signal developed by the detector means pertaining to each motor the said members will move relatively on the respective axis about five arc-minutes.

8. The search mount according to claim 1 in which said axes comprises a generally vertical first axis and a horizontal second axis, one of said members adapted for fixed emplacement with said first axis in a desired position of orientation relative to the earth and the other thereof adapted to support a viewing device such as a telescope.

9. The method of operating a telescope search mount having a telescope support member movable about a pair of angularly related pivot axes and having a pair of drive motors connected to the support member for movement thereof about the respective pivot axes, said method comprising for each axis: expressing a desired position of the support member about the respective pivot axis in the form of a predetermined number of increments of movement of a predetermined magnitude away from a predetermined reference position, directly sensing the number of rotations of the respective motor and generating a pulse during the rotation of the motor for each amount of rotation by the motor necessary to move the support member one increment, algebraically accumulating the pulses generated during movement of the respective motor, comparing the expressed number of increments with the accumulated number of pulses; energizing the respective motor to run in a direction to make the number of pulses equal to the expressed number of increments, deenergizing the motor when said numbers are equal, and providing substantially zero backlash speed reduction between the respective motor and the support member.

10. The method according to claim 9 in which one rotation of each motor moves the support member one said increment and a single said pulse is generated during a single rotation of the motor.

11. The method according to claim 9 which includes displaying said expressed number of increments and the number of pulses accumulated.

12. The method according to claim 9 which includes energizing the motors independently of said comparing to determine the number of increments of movement of the support member from said reference position thereof to bring an uncatalogued object within viewing range of a telescope on said support member.

13. The method according to claim 9 which includes energizing said motors independently of said comparing to lay a telescope on said support member on an observable object so that the number of pulses algebraically accumulated for each motor relative to the reference point thereof will correspond to the coordinates of the object expressed in increments of movement of said support member away from the reference position thereof.

14. The method according to claim 9 which includes braking each motor upon deenergization thereof.

15. The combination according to claim 6 including a pair geared speed reducers connected respectively between each said motor and the respective one of said members, each said speed reducer comprising: a first gear, a second gear adjacent said first gear and having fewer teeth than said first gear, at least one of said gears being flexible, at least one of said gears being fixed against rotation and the other of said gears drivingly connected to the respective member, a rotatable input element driven by said motor, and means carried by said input element for pressing at least one circumferential region of said gears into meshing engagement.

16. The combination of claim 15 wherein: said gears are respectively internally toothed and externally toothed gears, said externally toothed gear having an axial portion and being open toward the inside, said input element comprising a carrier, at least one roller on the carrier engaging the inside of said axial portion of said internally toothed gear, and spring means for biasing said roller against said axial portion.

* * * * *

UNITED STATES PATENT AND TRADEMARK OFFICE
CERTIFICATE OF CORRECTION

PATENT NO. : 4,142,139
DATED : February 27, 1979
INVENTOR(S) : Mathew A. Slaats, Alan B. Welsh, Wade R. Bray, Billy J. Whittington It is certified that error appears in the above-identified patent and that said Letters Patent are hereby corrected as shown below:

Billy J. Whittington of Jasper, Indiana should be included as a co-inventor.

Column 1, line 17, change "determinted" to --determined--.
Column 1, line 56, after "vertically." insert the following, --The degree of vertical tilt of the telescope is referred to as the "declination" and the degree of angular displacement of the telescope about a vertical axis is referred to as the "right ascension." Each point on the imaginary celestial sphere is assigned an address comprising these two numbers.--
Column 3, line 50, change "worn" to --worm--.
Column 7, line 12, change "would" to -- could--.
Column 7, line 16, change "would" to --could--.

Claim 15, Column 10, line 6 insert --of-- after "pair";
line 7, insert --means-- after "motor";
line 8, delete "members" and insert --elements-- therefor.

Signed and Sealed this

Second Day of October 1979

[SEAL]

Attest:

RUTH C. MASON
Attesting Officer

LUTRELLE F. PARKER
Acting Commissioner of Patents and Trademarks